H. J. CASE.
TRACTOR DRAWBAR.
APPLICATION FILED JUNE 20, 1921.

1,414,457.

Patented May 2, 1922.
2 SHEETS—SHEET 1.

Inventor
Harry J. Case.

By Watson E. Coleman, Attorney

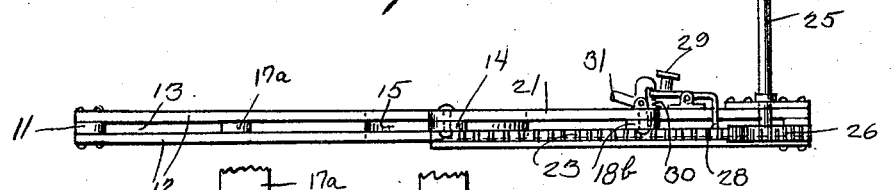
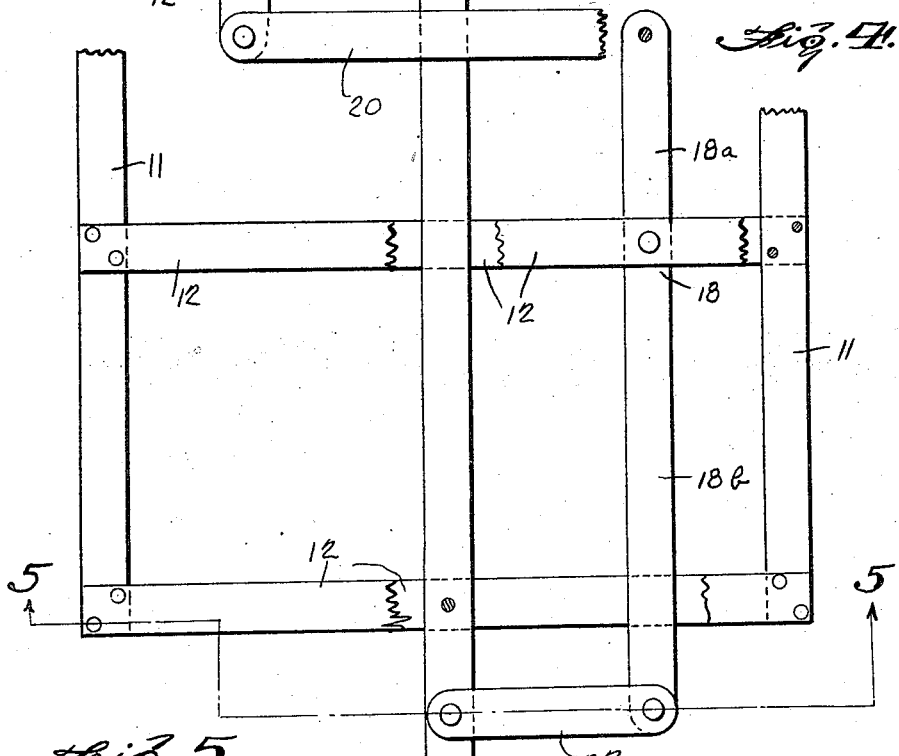
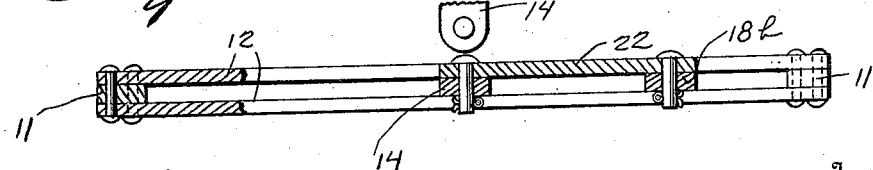

UNITED STATES PATENT OFFICE.

HARRY J. CASE, OF POTOSI, WISCONSIN.

TRACTOR DRAWBAR.

1,414,457.  Specification of Letters Patent.  Patented May 2, 1922.

Application filed June 20, 1921. Serial No. 478,956.

*To all whom it may concern:*

Be it known that I, HARRY J. CASE, a citizen of the United States, residing at Potosi, in the county of Grant and State of Wisconsin, have invented certain new and useful Improvements in Tractor Drawbars, of which the following is a specification, reference being had to the accompanying drawings.

This invention relates to improvements in tractors, and more particularly to improvements in drawbar mountings for tractors.

An important object of the invention is to provide a drawbar which will automatically compensate for the slipping or skidding of the tractor in side hill plowing.

A further object of the invention is to provide a drawbar which may be adjusted to various angles with relation to the tractor so as to provide for the attachment thereto of various implements used in agriculture.

A still further object of the invention is to provide a device of this character which is extremely simple in construction and operation and in which the component parts may be readily assembled and disassembled to permit of repairs and replacement.

Other objects and advantages of the invention will become apparent throughout the course of the following description.

In the accompanying drawings, wherein for the purpose of illustration is shown a preferred embodiment of my invention and wherein like reference characters designate like parts throughout:

Figure 3 is an enlarged rear elevation of the structure shown in Figure 2;

Figure 4 is an enlarged fragmentary plan partly in section showing the lever connections;

Figure 5 is a detail section on the line 5—5 of Figure 4.

Figure 1:
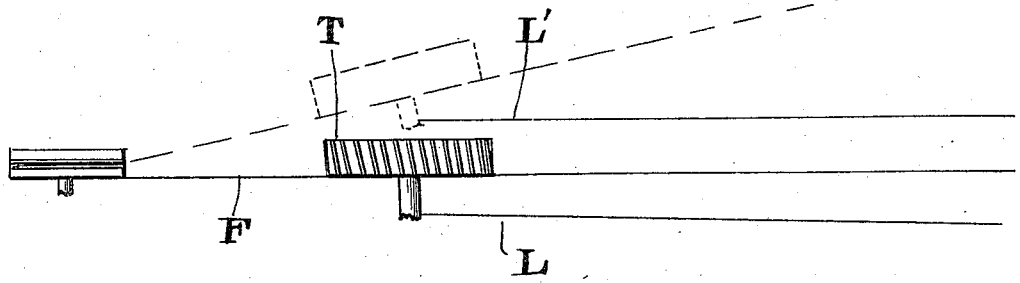
Figure 1 is a diagrammatic view.

Referring now more particularly to the drawings, the numeral 10 indicates a frame adapted to be secured to the rear end of a tractor T. This frame comprises side members 11 having secured thereto upper and lower sets of transverse members 12, affording therebetween a space 13. In the space 13 a drawbar 14, extending longitudinally of the frame 10, is situated and is provided at its forward end with rollers 15 abutting the forward crossbar 12 at one or both sides of the frame. The rear end of the drawbar 14 is adapted for engagement with the drawbar of the implement to be drawn.

Pivotally connected to one of the intermediate crossbars 12 at one side of the drawbar 14 is a lever 17, the forward end of which is in lateral line with the forward end of the drawbar 14. Pivotally connected to the other intermediate crossbar 12, at the opposite side of the drawbar, is a second lever 18. The levers 17 and 18 are so pivoted that the rear and forward ends thereof, respectively, are the short ends. The long or forward end 17$^b$ of the lever 17 is connected to the forward end of the drawbar 14 by means of a link 19. The rear or shorter end 17$^a$ of the lever 17 is connected by a link 20 with the forward or shorter end 18$^a$ of the lever 18, the rear or longer end 18$^b$ of the lever 18 being connected by the link 21 with the drawbar 14 adjacent the rear end thereof.

Figure 2:
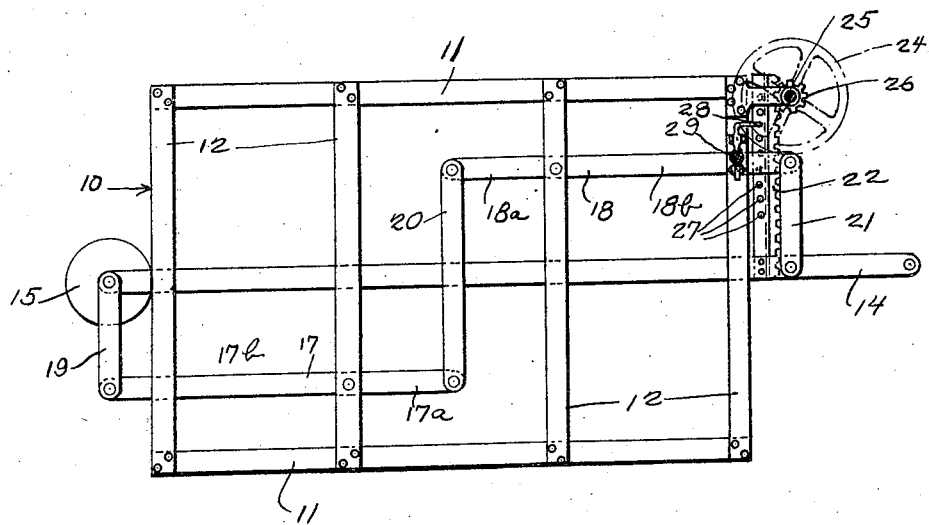
Figure 2 is a plan showing in detail the construction of the draw bar hitch.

An inspection of these connections, as shown in Figure 2, will render obvious the fact that if the rear end of the drawbar is shifted in one direction, as would result if the rear end of the tractor were to slide or skid suddenly to one side, the forward end of the drawbar would likewise move in this same direction, but a lesser distance, with the result that the drawbar would be moved in the opposite direction to the direction of skid of the tractor and at the same time be disposed at an angle to the tractor, so that the drawbar would maintain substantially the same position with regard to the drawn implement, and accordingly the drawn implement would continue to move in a straight line regardless of the skid of the tractor. This may possibly be better illustrated by an inspection of the diagrammatic view shown in Figure 1, in which F designates the furrow, and T, the tractor, the tractor being illustrated as working with front and rear wheels in the furrow. L indicates the line of draft of a plow attached to the tractor. In dotted lines the position of the tractor resulting from a skid is shown, and the line L' represents the true line of draft from the tractor when it has skidded. With a drawbar such as previously described, the drag of the plow or other drawn implement will cause the rear end of the drawbar 14 to move transversely of the vehicle, and the accompanying lesser movement of the forward end of the line of draft would remain substantially upon the line L, preventing a slip in the furrow line.

As in many instances it is desirable that the drawbar be adjusted with relation to the tractor when securing different implements thereto, I secure to the drawbar an arm 22, in the present disclosure being shown as an angle iron bar, to one side of which is secured a rack 23. A hand-wheel 24 is provided, to the shaft 25 of which is secured a pinion 26 meshing with the rack 23 so that the arm 22, and accordingly the drawbar 14, may be adjusted transversely of the vehicle, as desired. In order that the bar 22 may be held in adjusted position, I form therein openings 27 which are adapted to receive a catch 28 formed upon a foot-lever 29, the catch 28 thereof normally being held in engagement within a selected opening by a spring 30. The catch 28 may be completely withdrawn from the openings 27 so as to permit the free movement of the bar 22 when automatic adjustment of the drawbar 14 is desired, and may be held in such withdrawn position by engaging the same with the lug 31.

It will thus be obvious that the drawbar 14 may either be adjusted manually or may be arranged so that it will automatically maintain alinement with a drawn implement. It will furthermore be obvious that many changes are possible in the shape, size and arrangement of the various parts hereinbefore set forth without in any manner departing from the spirit of my invention, and I accordingly do not limit myself to the specific construction hereinbefore set forth except as hereinafter claimed.

What I claim is:

1. In a tractor, a rigid supporting frame, a drawbar transversely shiftable with relation to the frame, and means connecting the frame and drawbar whereby shifting of one end of the drawbar causes shifting of the opposite end thereof in the same direction but through a different distance.

2. In a tractor, a rigid supporting frame, a drawbar transversely shiftable with relation to the frame, and means connecting the frame and drawbar whereby shifting of one end of the drawbar causes shifting of the opposite end thereof in the same direction but through a different distance, and means for manually shifting one end of the drawbar.

3. In a tractor, a rigid supporting frame, a drawbar transversely shiftable with relation to the frame, and means connecting the frame and drawbar whereby shifting of one end of the drawbar causes shifting of the opposite end thereof in the same direction but through a different distance, means for manually shifting one end of the drawbar, and means for locking the drawbar in adjusted position.

4. A drawbar mounted for transverse shifting and a link and lever connection between opposite ends of the drawbar whereby shifting of one end of the drawbar causes shifting of the opposite end thereof in the same direction but through a different distance.

5. In combination with a tractor, a rigid frame secured thereto and extending rearwardly therefrom, a drawbar mounted for transverse movement within the frame, levers pivotally mounted on the frame upon opposite sides and adjacent opposite ends of the drawbar, link connections between the ends of the drawbar and corresponding ends of the levers, and a link connection between the adjacent ends of the levers.

6. A drawbar mounted for transverse shifting and a link and lever connection between opposite ends of the drawbar whereby shifting of one end of the drawbar causes shifting of the opposite end thereof in the same direction but a different distance, an arm secured to the lever embodying a rack, a pinion meshing with the rack, means for rotating the pinion and means for locking the arm against movement.

7. The combination with a drawbar mounted for transverse movement, and means connecting the ends of the drawbar for maintaining the drawbar in radial alinement with the center lying in advance of the forward end of the drawbar.

In testimony whereof I hereunto affix my signature.

HARRY J. CASE.